United States Patent [19]

Suzuki et al.

[11] Patent Number: 4,826,911

[45] Date of Patent: May 2, 1989

[54] RUBBER COMPOSITIONS FOR AUTOMOBILE TIRE TREADS

[75] Inventors: Yoshihiko Suzuki; Masashi Kida, both of Hiratsuka; Asahiro Ahagon, Fujisawa; Yuichi Saitoh, Isehara; Youichi Yamaguchi, Hiratsuka, all of Japan

[73] Assignee: The Yokohama Rubber Co., Ltd., Tokyo, Japan

[21] Appl. No.: 143,174

[22] Filed: Jan. 13, 1988

[30] Foreign Application Priority Data

Jan. 13, 1987 [JP] Japan ..................................... 62-4102

[51] Int. Cl.$^4$ ........................... C08K 3/04; C08L 7/00; C08L 9/00; C08L 9/06
[52] U.S. Cl. ............................... 524/526; 152/209 R; 525/236; 525/237
[58] Field of Search ....................... 524/526; 525/236; 152/209 R

[56] References Cited

U.S. PATENT DOCUMENTS

| | | | |
|---|---|---|---|
| 4,342,670 | 8/1982 | Ahagon et al. | 524/526 |
| 4,427,831 | 1/1984 | Komuro et al. | 525/236 |
| 4,624,296 | 11/1986 | Takiguchi | 525/236 |

FOREIGN PATENT DOCUMENTS

| | | |
|---|---|---|
| 53-133248 | 11/1978 | Japan . |
| 55-135149 | 10/1980 | Japan . |
| 58-199203 | 11/1983 | Japan . |
| 59-142236 | 8/1984 | Japan . |
| 60-44538 | 3/1985 | Japan . |
| 60-137945 | 7/1985 | Japan . |

*Primary Examiner*—Allan M. Lieberman
*Attorney, Agent, or Firm*—Finnegan, Henderson, Farabow, Garrett & Dunner

[57] ABSTRACT

Tread rubber compositions or use in automobile tires are disclosed which essentially comprise matrix rubbers and specified amounts of a selected class of low-hardness vulcanized rubbers having specified particle sizes. The matrix and vulcanized rubbers include carbon black, respectively, in amounts defined by the equation $0 < X \leq Y/3$ where X is the amount of carbon black present in the vulcanized rubber, and Y is the amount of carbon black in the matrix rubber, each such amount being based on the total weight of the matrix rubber. The resulting tire is rendered highly resistant to snowy and icy conditions and also to abrasive wear.

1 Claim, No Drawings

RUBBER COMPOSITIONS FOR AUTOMOBILE TIRE TREADS

BACKGROUND OF THE INVENTION

1. Field of the Invention

This invention relates to rubber compositions particularly suitable for use in automobile tire treads.

2. Description of the Prior Art

From the safety point of view, spiked tires and tire chains are in common use in the snowy season. The spikes and chain links are brought, while in driving, into severe frictional contact with the road breaking up the road and causing dust hazards after thawing. This poses dangerous as well as environmental pollution problems. Alternatively, improved tires have come to light which are stud-free and have good braking traction even under snowy and icy conditions.

Many attempts have been made to further improve stud-free tires with respect to their braking and traction qualities on snow and ice. It has been proposed to reduce the hardness of tread rubber at low temperature with use of large amounts of softeners and plasticizers as disclosed for instance in Japanese patent laid-open publication Nos. 55-135149, 58-199203 and 60-137945. Excess softener and plasticizer, though making the tread rubber sufficiently resistant to skidding on snow or ice, renders the resulting tire highly abrasive to frictional contact with a road not covered with snow or ice.

Japanese patent laid-open publication Nos. 60-44538, 59-142236 and 53-133248 disclose that high-hardness rubbers having particulate minerals or organic monofilaments can be dispersibly blended with the tread rubber composition. This prior composition when vulcanized, however, is readily susceptible to cracking in the neighbourhood of the dispersed material due to the magnitude of hardness.

A carbon black-free rubber composition has been found effective in improving icy friction. It has also been found that the absence of, or if present, too small a content of carbon black, makes the composition too susceptible to abrasion to warrant commercial application.

SUMMARY OF THE INVENTION

It is therefore the primary object of the present invention to provide a rubber composition for use in automobile tire treads which are devoid of the foregoing difficulties of the prior art and which excels in icy friction and abrasion resistance, giving automotive tires that are efficient and safe on a snowy or icy road.

More specifically, the rubber composition of the invention is essentially made up of a selected matrix rubber combined with a specified amount of a selected vulcanized rubber having a specified particle size. Each of the two rubbers contains a specified amount of carbon black.

According to the invention, there is provided a rubber composition for use in automobile tire treads which comprises: (A) a matrix rubber comprising a first starting rubber and 40-100 parts by weight of carbon black, the amount being based on 100 parts by weight of the first starting rubber, and (B) 4-40 parts by weight of a low-hardness vulcanized rubber, the amount being based on 100 parts by weight of the first starting rubber, the vulcanized rubber having an average particle size of smaller than 2 mm and comprising a second starting rubber and carbon black, the amount of carbon black being defined by the equation $0 < X \leq Y/3$ where $X$ is the amount of carbon black in (B), and $Y$ is the amount of carbon black in (A).

DETAILED DESCRIPTION OF THE INVENTION

Rubbers eligible as first starting rubbers for the matrix rubber composition of the present invention include for example natural rubber (NR), polyisoprene rubber (IR), butadiene rubber (BR), styrene/butadiene rubber (SBR), halogenated butyl rubber (hal IIR) and the like. These rubbers may be used alone or in combination. With excellent frictional force on ice in view, NR, IR, BR or their blend is particularly preferred.

No particular restriction is imposed on the type of carbon black. Any carbon black may be feasibly used which is known for tire tread formation in the art. The amount of carbon black to be added should be in the range of 40-100 parts by weight per 100 parts by weight of the first starting rubber. Carbon black in smaller amounts than 40 parts fails to give sufficient reinforcement and if larger amounts than 100 parts are used this leads to objectionable heat buildup.

Suitable vulcanized rubbers to be combined with the matrix rubber are those derived by vulcanizing rubber compositions of predetermined formulations and having low hardness. Specific examples of second starting rubbers include NR, IR, BR, SBR, hal IIR and blends of two or more rubbers. The vulcanized rubber composition should contain carbon black in such an amount as to meet with the equation $0 < X \leq Y/3$. Variable $X$ is the amount of carbon black present in the vulcanized rubber composition, and variable $Y$ is the amount of carbon black in the matrix rubber composition. $X$ exceeding $Y/3$ would make the resulting tire less frictional on ice.

According to an important aspect of the invention, the amount of the vulcanized rubber to be added should be in the range of 4-40 parts by weight per 100 parts by weight of the first starting rubber. Smaller amounts than 4 parts would be insufficient in icy friction, and larger amounts than 40 parts would result in reduced resistance to abrasion. Also importantly, the vulcanized rubber may be in a cubic, rod-like, particulate or similar shape, but should in each case be smaller than 2 mm in average particle size. Larger particle sizes would lead to durability deterioration. The hardness of the vulcanized rubber may be in the range of 20-50 as determined by the JIS procedure.

Various other additives may be incorporated in each of the matrix and vulcanized rubber compositions, which additives include for example softeners, vulcanizing agents, vulcanization accelerators, vulcanizing aids, antioxidants and the like.

The following examples are provided for a better understanding of the present invention, but should not be regarded as limiting the invention.

Examples 1-8 and

Comparative Examples 1-7

Matrix and vulcanized rubber compositions were formulated as shown in Tables 1 and 2.

A starting rubber was combined with additives, as shown in Table 2, in a Banbury mixer except that sulfur and accelerator were omitted, followed by addition of the latter two additives with use of an open roll and by subsequent vulcanization of the admixture, thereby providing a vulcanized rubber sheet (B) of predetermined thickness. The sheet after being cut into a cubic shape was blended with the components of Table 1 in a similar mixer except for sulfur and accelerator. To the blend were added such remaining additives by an open roll to thereby give a rubber composition (A) which was then vulcanized.

The vulcanizate was examined for icy friction and abrasive wear under the conditions given below and with the results shown in Table 3.

Icy Friction

ASTM E-303-74 was followed. Skid was measured on an ice plate at −6° C. with use of a British portable skid-tester. Frictional force was determined by taking Comparative Example 1 as the criterion of control.

Abrasion Resistance

A vulcanized rubber disc of 10 mm thickness and 60 mm diameter was exposed to forcible wear on a rotary drum at a slip rate of 25% for a predetermined length of time. Abrasive wear was determined by weight losses in the disc. Comparative Example 1 was taken as an index of 100.

It has been confirmed from Table 3 that controls devoid of and beyond the specified range of vulcanized rubber failed to give sufficient friction on ice as evidenced by Comparative Examples 1 and 2. Excessive vulcanized rubber, Comparative Example 3, showed a sharp decline in resistance to abrasion.

A larger amount of a paraffinic oil, Comparative Example 4, was effective for improving icy friction but in an extent to reduce abrasion resistance. A similar problem took place in Comparative Example 5 in which aramide fibers were added.

Icy friction and abrasion resistance have proved satisfactory in Examples 1, 3 and 4 in which different rubbers are used as vulcanized rubbers.

As was apparent from Comparative Example 6, the use of excess carbon black in a vulcanized rubber encountered unacceptable friction on ice.

A vulcanized rubber of a larger particle size, Comparative Example 7, was insufficient in abrasion resistance.

A blend of different polymers as a vulcanized rubber is highly satisfactory in respect of icy friction and abrasion resistance as can be seen from Example 8.

Having thus described the present invention, it will be apparent to those skilled in the art that many changes and modifications may be made to the invention without departing from the scope of the appended claims.

TABLE 1

| Rubber Composition | |
|---|---|
| Formulation | Weight Part |
| starting rubber | 100 |
| zinc oxide | 4 |
| stearic acid | 2 |
| antioxidant*1 | 2 |
| carbon black | suitable amount |
| softener | " |
| vulcanized rubber | " |
| accelerator*2 | 1 |
| sulfur | 2 |

Notes:
*1 N—ispropyl-N'—phenyl-p-phenylene diamine
*2 N—oxydiethylene-2-benzothiazyl sulfenamide

TABLE 2

| Vulcanized Rubber | |
|---|---|
| Formulation | Weight Part |
| starting rubber | 100 |
| zinc oxide | 4 |
| stearic acid | 2 |
| antioxidant*1 | 2 |
| carbon black | suitable amount |
| accelerator*2 | 1 |
| sulfur | 2 |

Notes:
*1 and *2 same as in footnotes to Table 1

TABLE 3

| Formulations*1 | Base Comparative Example 1 | Effects of varying amounts of vulcanizate (B) | | | | Prior art Comparative Examples | | Effects of different polymers in vulcanizate (B) Examples | |
|---|---|---|---|---|---|---|---|---|---|
| | | Comparative Example 2 | Examples 1 | 2 | Comparative Example 3 | 4 | 5 | 3 | 4 |
| Tread rubber composition (A) | | | | | | | | | |
| NR | 100 | 100 | 100 | 100 | 100 | 100 | 100 | 100 | 100 |
| BR*2 | | | | | | | | | |
| SBR*3 | | | | | | | | | |
| carbon black N 220 | 50 | 50 | 50 | 50 | 50 | 50 | 50 | 50 | 50 |
| aromatic oil | 5 | 5 | 5 | 5 | 5 | 5 | 5 | 5 | 5 |
| paraffinic oil | | | | | | 25 | | | |
| aramide short fiber | | | | | | | 8 | | |
| rubber vulcanizate (B) | | 3 | 10 | 20 | 50 | | | 10 | 10 |
| Rubber vulcanizate (B) | | | | | | | | | |
| NR | | 100 | 100 | 100 | 100 | | | | |
| IR | | | | | | | | 100 | |
| BR | | | | | | | | | 100 |
| carbon black N 220 | | | | | | | | | |
| average particle size (mm) | | 1 | 1 | 1 | 1 | | | 1 | 1 |
| Properties of composition (A) | | | | | | | | | |
| icy frictional force | 100 | 109 | 122 | 131 | 139 | 121 | 115 | 119 | 116 |
| abrasion resistance | 100 | 97 | 94 | 92 | 75 | 81 | 76 | 95 | 98 |
| | | Effects of varying amounts of carbon black in vulcanizate (B) | | | | Effects of varying particle sizes in vulcanizate (B) | | Effects of polymer blends in | |

TABLE 3-continued

| Formulations*1 | Examples 5 | Examples 6 | Comparative Example 6 | Example 7 | Comparative Example 7 | composition (A) Example 8 |
|---|---|---|---|---|---|---|
| Tread rubber composition (A) | | | | | | |
| NR | 100 | 100 | 100 | 100 | 100 | 40 |
| BR*2 | | | | | | 40 |
| SBR*3 | | | | | | 20 |
| carbon black N 220 | 50 | 50 | 50 | 50 | 50 | 60 |
| aromatic oil | 5 | 5 | 5 | 5 | 5 | |
| paraffinic oil | | | | | | 20 |
| aramide short fiber rubber vulcanizate (B) | 10 | 10 | 10 | 10 | 10 | 10 |
| Rubber vulcanizate (B) | | | | | | |
| NR | 100 | 100 | 100 | 100 | 100 | 100 |
| IR | | | | | | |
| BR | | | | | | |
| carbon black N 220 | 5 | 17 | 20 | | | |
| average particle size (mm) | 1 | 1 | 1 | 0.5 | 3 | 1 |
| Properties of composition (A) | | | | | | |
| icy frictional force | 120 | 115 | 108 | 122 | 121 | 130 |
| abrasion resistance | 96 | 97 | 98 | 93 | 88 | 95 |

Notes:
*1part by weight
*2NIPOL BR 1220, Nippon Zeon Co., Ltd., cis content 98%
*3NIPOL SBR 1502, Nippon Zeon Co., Ltd., styrene content 23.5%

What is claimed is:

1. A rubber composition for automobile tire treads comprising:
   (A) a matrix rubber comprising a first starting rubber and 40-100 parts by weight of carbon black based on 100 parts by weight of said first starting rubber; and
   (B) 4-40 parts by weight of a vulcanized rubber having a hardness of from 20-50 as determined by JIS standards based on 100 parts by weight of said first starting rubber, said vulcanized rubber having an average particle size of smaller than 2 mm and comprising a second starting rubber and carbon black, the amount of carbon black present being defined by the equation $0 < X \leq Y/3$ where X is the amount of carbon black in (B), and Y is the amount of carbon black in (A); said first and second starting rubbers being selected from the group consisting of natural rubber, polyisoprene rubber, butadiene rubber, styrene/butadiene rubber, halogenated butyl rubber and combinations thereof.

* * * * *